Nov. 24, 1964   S. H. KAUFFMAN ET AL   3,158,351
CHARGING VALVE
Filed July 20, 1962
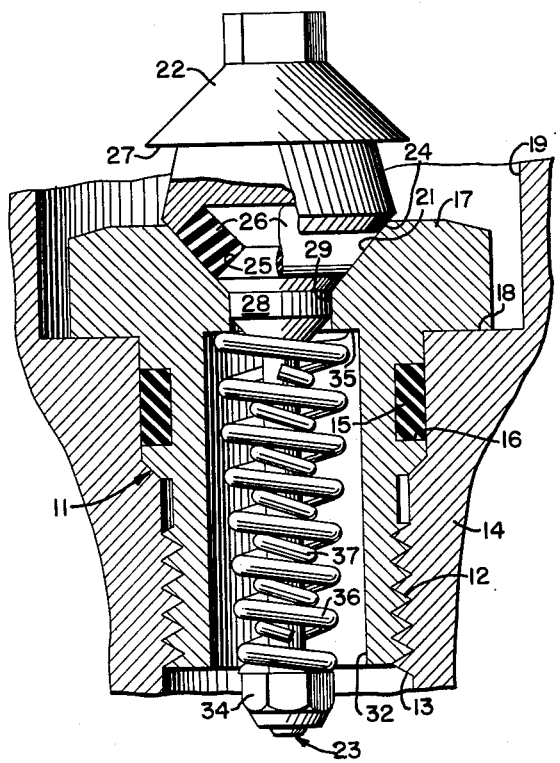
FIG.1.
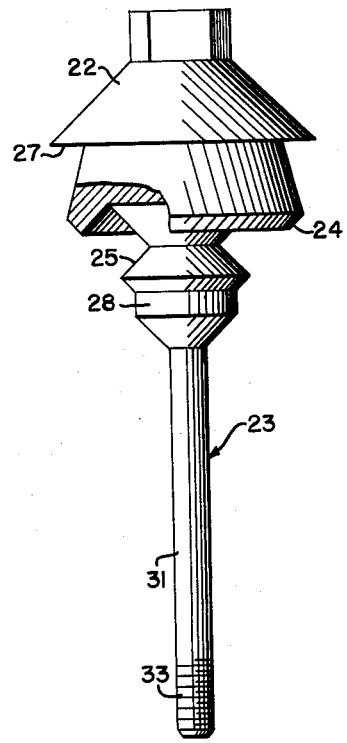
FIG.2.
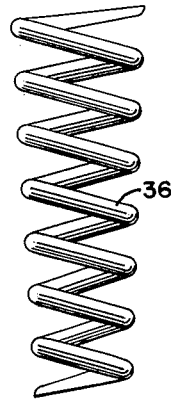
FIG.3.
FIG.4.
INVENTORS
SAMUEL H. KAUFFMAN
RICHARD W. HOLDEN
BY
*D. E. Hodges*
*Frank P. Presta*   ATTY.
                    AGENT.

United States Patent Office 3,158,351
Patented Nov. 24, 1964

3,158,351
CHARGING VALVE
Samuel H. Kauffman and Richard W. Holden, Silver Spring, Md., assignors to the United States of America as represented by the Secretary of the Navy
Filed July 20, 1962, Ser. No. 211,459
4 Claims. (Cl. 251—322)
(Granted under Title 35, U.S. Code (1952), sec. 266)

The invention described herein may be manufactured and used by or for the Government of the United States of America for governmental purposes without the payment of any royalties thereon or therefor.

This invention relates to a valve construction and more particularly to a miniature charging valve for pressurizing underwater equipment.

In the pressurizing of underwater equipment, the need has arisen for a small charging valve capable of withstanding high external pressures and predetermined internal pressures. Charging valves in present use have the disadvantages of opening under high external pressures, being contructed such that a manual adjustment would be required to insure proper sealing, utilizing valve springs which would be compressed to a solid height to obstruct flow through the valve, possessing inconsistent operability under pressure charges, and requiring a large expense for manufacturing in a small or miniature form.

The general purpose of this invention is to provide a charging valve which embraces all the advantages of similarly employed valves and possesses none of the aforedescribed disadvantages. To attain this, the present invention contemplates an improved valve construction which is rugged, reliable, and inexpensive to manufacture owing to a minimum of parts, and which will remain closed against high external pressures.

An object of the present invention is the provision of a new and improved miniature charging valve of the character described.

Another object is to provide a miniature charging valve which will remain closed against high external pressures and also against specified or predetermined internal pressures.

A further object of the invention is the provision of a charging valve of miniature size possessing good flow characteristics owing to the prevention of solid height compression of the valve biasing means located in the flow path.

Still another object is to provide a miniature charging valve which is rugged, reliable and economical to manufacture in miniature form.

Yet another object of the present invention is the provision of a miniature valve construction comprising a minimum of parts to insure proper operation without adjustment under varying external pressure conditions.

Other objects and various further features of novelty and invention will be apparent to those skilled in the art from a reading of the following specification and claims in conjunction with the accompanying drawing, which shows, for illustrative purposes only, a preferred form of the invention and in which:

FIG. 1 is an elevational view, partly in section, of a preferred embodiment of the invention;

FIG. 2 illustrates an elevation of a portion of the apparatus, more particularly the valve stem, shown in FIG. 1;

FIG. 3 shows an elevational view of the valve spring disclosed in FIG. 1; and

FIG. 4 is an elevational view of the spacer spring shown in FIG. 1 and the shape of a coil thereof.

In the illustrated example of the invention and referring first to FIG. 1, the reference numeral 11 designates a valve housing which has a threaded portion 12 on one end thereof for the purpose of mounting the housing 11 in a threaded recess 13 in the casing 14 of the equipment to be pressurized. An O-ring 15 is provided in an annular groove 16 of the housing 11 for sealing purposes, and a flange portion 17 is provided on the housing to limit the movement thereof within the threaded recess 13 of the casing 14. The flange portion 17 rests on the flat surface 18 in a second and larger recess 19 in the casing 14 which is adapted to receive charging apparatus therein which is not disclosed since it forms no part of this invention. The laterally extending portion 27 is provided on the head 22 to allow the head to be gripped by the charging apparatus inserted into the recess 19 for the purpose of opening the valve for charging.

As shown in FIGS. 1 and 2, a conical valve seat 21 is provided in the housing 11 to receive a head portion 22 which is an intgeral part of the valve stem 23. The head portion 22 has a conical surface 24 corresponding to that of the valve seat 21 and has a groove 25 formed therein to receive an O-ring 26 therewithin to insure adequate sealing. The stem 23 is provided with a central cylindrical portion 28 which is slideably mounted in a cylindrical interior portion 29 of the housing 11. A narrow rod-like portion 31 extends from the cylindrical portion 28 of the stem 23 through a second cylindrical interior portion 32 of the housing 11. The rod-like portion 31 has a threaded end 33 which is adapted to adjustably receive a threaded nut 34 thereon. Since the cylindrical portion 32 of the housing 11 is larger than the cylindrical portion 29, an annular seat 35 is provided within the housing for one end of the tapered, circular coil valve spring 36 shown in FIGS. 1 and 3 which surrounds rod-like portion 31 of the valve stem 23 and is retained thereon by the threaded nut 34. To prevent the circular coil spring 36 from being compressed to a solid height, which would reduce flow through the valve, a spacer spring 37 shown in FIGS. 1 and 4 is provided of quasi-elliptical cross section to separate the valve spring coils when the springs are compressed. The spacer spring 37 also surrounds the rod-like portion 31 and has its coils alternating with those of the circular coil spring 36. Since the spacer spring is of quasi-elliptical cross section and the valve spring is of circular cross section, there will be no compression of the springs to a solid height and therefore no substantial impediment to the flow through the valve. The compression of the springs and therefore the resistance to the opening of the valve may be adjusted by varying the position of the nut 34 on threaded end 33 of the rod-like portion 31 which forms an integral part of the valve stem 23.

In operation, the springs 36 and 37 will normally bias the conical surface 24 on the valve head portion 22 and the O-ring 26 in sealing relationship with the conical valve seat 21 in the housing 11, thereby sealing the interior of the equipment to be pressurized. The force of the springs 36 and 37 is sufficient to withstand predetermined internal pressures in the order 15 to 45 lbs. per square inch, and owing to the construction of the present invention, high external pressures will increase the sealing capacity of the valve head and O-ring on the conical seat 21. This valve construction will successfully withstand high external pressures in the order of approximately 1000 lbs. per square inch, a feature not possessed by similar prior art valves of a corresponding miniature size.

When it is desired to charge the equipment to be pressurized, suitable charging apparatus is inserted into the recess 19 in the casing 14 of the equipment. The charging apparatus is adapted to engage the laterally extending portion 27 on the valve head 22 to raise the valve head 22 from the conical valve seat 21 in the housing 11 against the force of the springs 36 and 37 and therefore allow charging of the equipment through the threaded recess 13 in the casing 14. Upon release of the laterally extending portion 27 of the valve head 22, the springs 36 and 37 will return the conical surface 24 of the valve head and the O-ring 26 into sealing relationship with the conical seat 21 in the housing 11.

It is to be noted that the present invention results in a miniature valve construction, approximately ½ of an inch wide and ⅞ of an inch long, which is simple, rugged, reliable in operation, and which will withstand very high external pressures and specified or predetermined internal pressures with a minimum of adjustment.

While the invention has been described in detail for the preferred form shown, it will be understood that modifications may be made within the scope of the invention as defined in the appended claims.

What is claimed is:

1. In a charging valve for pressurizing underwater apparatus, a valve housing having a conical seat at one end thereof and a cylindrical bore therethrough extending from said seat to the other end of said housing, an annular shoulder formed in said housing between said conical seat and said cylindrical bore, said housing having means at said one end thereof for fluid connection to charging apparatus, a valve stem slidably mounted in said bore and having a head portion shaped to be received in said seat and to be raised therefrom by the charging apparatus while a pressure charge is applied thereto, said head portion having an annular groove therein, sealing means mounted in said groove to engage said seat when said head portion is received therein, said stem having a threaded portion adjacent the end thereof within said bore, a nut retainably received on said stem threaded portion, a circular coil spring of greater diameter than the opening in said conical seat surrounding said stem and having the ends thereof in abutment with said annular shoulder and said nut respectively so that the interior of said circular coil spring is in direct fluid communication with the opening in said conical seat, and a quasi-elliptical coil spring surrounding said stem and having the coils thereof alternating with the coils of said circular coil spring in a manner to reinforce the bias of the circular coil spring and to also prevent said circular coil spring from being compressed to a solid height as the head portion of the valve is raised from said seat by the charging apparatus, whereby free flow of fluid from the charging apparatus through the conical seat into the interior of the coil spring and then between the coils of springs to the exterior of said springs is always assured.

2. The apparatus of claim 1 wherein said housing has a laterally extending flange portion at one end and a threaded exterior portion at the other end thereof for mounting said housing on the apparatus to be pressurized.

3. The apparatus of claim 1 wherein said head portion is provided with a lateral extension near the outer end thereof to be engaged by charging apparatus for removal of said head portion from said seat.

4. The apparatus of claim 1 wherein said head portion has a conical surface to be received in said seat, said groove is formed in said conical surface, and said sealing means comprises an O-ring substantially filling said groove.

References Cited by the Examiner

UNITED STATES PATENTS

| | | | |
|---|---|---|---|
| 1,774,690 | 9/30 | Willoughby | 137—541 |
| 2,998,242 | 8/61 | Schwarzbeck et al. | 267—61 |

FOREIGN PATENTS

| | | |
|---|---|---|
| 1,035,787 | 4/53 | France. |
| 112,850 | 1/45 | Sweden. |

LAVERNE D. GEIGER, *Primary Examiner.*

M. CARY NELSON, *Examiner.*